United States Patent [19]

Carpenter

[11] Patent Number: 5,078,870

[45] Date of Patent: Jan. 7, 1992

[54] UNPOTTED APPARATUS FOR MAGNETICALLY TREATING LIQUIDS FLOWING THROUGH RELATIVELY LARGE PIPES AND THE MANNER OF ATTACHING SAME TO THE EXTERIOR OF SUCH PIPES

[76] Inventor: Roland K. Carpenter, 251 W. Canal Dr., Palm Harbor, Fla. 34684

[21] Appl. No.: 568,771

[22] Filed: Aug. 17, 1990

[51] Int. Cl.$^5$ .............................................. C02F 1/48
[52] U.S. Cl. .................................... 210/222; 210/232; 55/100
[58] Field of Search .................... 210/222, 232; 55/100

[56] References Cited

U.S. PATENT DOCUMENTS

| | | | |
|---|---|---|---|
| 3,228,878 | 1/1966 | Moody | 210/222 |
| 4,265,746 | 5/1981 | Zimmerman, Sr. et al. | 210/695 |
| 4,265,755 | 5/1981 | Zimmerman | 210/232 |
| 4,367,143 | 1/1983 | Carpenter | 210/222 |
| 4,888,113 | 12/1989 | Holcomb | 55/100 |
| 4,946,590 | 8/1990 | Hertzog | 210/232 |
| 4,956,084 | 9/1990 | Stevens | 210/222 |

Primary Examiner—W. Gary Jones
Assistant Examiner—Matthew O. Savage
Attorney, Agent, or Firm—Peterson, Wicks, Nemer & Kamrath

[57] ABSTRACT

The apparatus includes a preferred number of permanent magnet units held against the exterior of a pipe through which liquid flows. Each unit includes a permanent magnet pack and pole pieces at the ends of the magnet pack. A housing encloses the permanent magnet pack, the pole pieces projecting through slots provided in the housing. The housing includes a bottom panel, side panels, and inwardly extending top panels, each top panel having an upwardly directed flange thereon. Bolts and nuts pass through these upwardly extending flanges. Additionally, the housing includes end panels having outturned flagnes. Wings composed of reversely folded panels have laterally spaced flanges thereon. Additional bolts and nuts secure the flanges on the end panels to the flanges on the wings so as to maintain the wings in an oppositely issuing relationship. Each wing has a slot formed therein so that any preferred number of units can be held tightly against the pipe through the agency of wires threaded through the various slots. The number of units to be employed depends upon the size of the pipe.

25 Claims, 3 Drawing Sheets

UNPOTTED APPARATUS FOR MAGNETICALLY TREATING LIQUIDS FLOWING THROUGH RELATIVELY LARGE PIPES AND THE MANNER OF ATTACHING SAME TO THE EXTERIOR OF SUCH PIPES

Background Of The Invention

1. Field of the Invention

This invention relates generally to apparatus for magnetically treating a liquid flowing through a relatively large-diameter pipe, and pertains more particularly to unpotted units that can be readily held in place against the exterior of the relatively large pipe to be serviced.

2. Description of the Prior Art

Perhaps U.S. Pat. No. 4,367,143 issued to Roland K. Carpenter on Jan. 4, 1983 for APPARATUS FOR MAGNETICALLY TREATING LIQUID FLOWING THROUGH A PIPE AND CLAMPING MEANS THEREFOR is representative of the state of the art. However, as mentioned in the applicant's issued Patent '143, U.S. Pat. No. 3,328,878 granted on Jan. 11, 1966 to Dean L. Moody for METHOD AND APPARATUS FOR TREATMENT OF FLOWING LIQUIDS TO CONTROL DEPOSITION OF SOLID MATTER THEREFROM also is representative of earlier prior art. As with the applicant's Patent '143 and Patent '878, both disclosures mention scale and paraffin problems, pointing out that scale can take various forms but typical of the substances creating scale problems are calcium carbonate, calcium sulfate, barium sulfate, sodium chloride, magnesium sulfate, silica, as well as various oils, waxes and greases in addition to paraffin. Accumulations of these substances on the interior of the pipe obviously produce problems, especially as far as causing a greater resistance to liquid flow within the pipe, and also where heat is applied to the pipe's exterior, the collected substances act as an objectionable thermal insulator. Sufficient accumulations, quite obviously, require that the piping system be inactivated and the pipes individually cleaned out, a time-consuming and costly procedure where the system is an industrial one, particularly due to the fact that the particular piping system is not productive during the shutdown period.

The polarization of diamagnetic materials through the agency of relatively strong magnetic fields provided by permanent magnetic means is generally well understood and need not be repeated at this time, although reference may be made to either of the patents herein referred to for a basic understanding of what is involved. Very succinctly, however, the principle behind the polarization is to prevent the formation of sufficiently objectionable deposits on the inside of the pipe, the magnetic action causing the diamagnetic materials to move inwardly under the influence of the sufficiently strong magnetic field provided by the two alluded to patented arrangements and which is even better achieved with the present invention as will soon become manifest. The difficulty is that with large diameter pipes the mounting of suitable permanent magnetic apparatus has posed a problem. Also, where large-diameter pipes are involved, the cost per unit where a potting compound is used has proven to be unduly high.

Examples of where when large-diameter pipes are employed are at pipe line terminals where crude oil is transferred from a pipe line to a tanker after first having been stored in one or more settling tanks. Inasmuch as the moisture content for shipping crude oil must be less than 1.0%, chemicals are also used as dessicants to dehydrate the oil. The result is that basically three separations are obtained in the tank: (1) the oil that rises to the top, (2) the water that goes to the bottom, and (3) an intermediate emulsion layer containing oil and water. Obviously, the less emulsion, the better because it is a waste product (as of course is the amount of water that must be removed); however, whatever oil is contained in the emulsion is also lost, so it is extremely advantageous to minimize the amount of emulsion that is produced. Without my invention, a large tank has been needed, filled, chemicals added, and the contents allowed to statically set for at least 24 hours to dehydrate the water down to the required sufficiently low level. With my magnetic apparatus applied to the pipe line just before it enters the tank, the oil may be taken out of the tank almost immediately in that there is a higher percentage of oil and water separating with a concomitantly lesser amount of emulsion being formed. The tank, therefore, can be much smaller, the process being virtually continuous.

SUMMARY OF THE INVENTION

While my invention operates on the same principle as other magnetic apparatus for treating liquids flowing through a pipe, an object of the present invention is to provide individual units that can be applied to the outside of the pipe in whatever number is needed to provide the diamagnetic polarization necessary to drive the diamagnetic substances inwardly away from the surfaces of the pipe's interior. While the number of individual units to be employed is susceptible to selection in accordance with the pipe diameter, the velocity of the liquid flowing through the pipe, the type of liquid and other factors, a general rule is that one unit be employed for each inch of pipe diameter. Hence, if the pipe diameter is four inches, four of my units would be employed, whereas if the pipe diameter is 60 inches, then 60 such units would be utilized.

The invention also has as an object the provision of exceedingly strong magnet units in relation to their overall size.

Another object of the invention is to provide units that can be readily mounted and demounted from the exterior of pipes irrespective of the pipe size. In this way, an aim of the invention is to allow an easy transposition of the units from one location to another, all in accordance with whatever location proves to be the most effective.

A very important object of the invention is to provide permanent magnet units that do not require the use of a potting compound as in the past. In this regard, an aim of the invention is to readily and quickly assemble the units at the factory as orders come in from the field for such units. Thus, when practicing my invention a large inventory need not be maintained of assembled units, as has been the case for potted units, for my units can be readily assembled as required.

Briefly, my invention envisages the use of an appropriate number of permanent magnet units that can be easily held in place against the exterior service of various diameter pipes, my invention permitting the appropriate number of such units to be held against the outside of the pipe through the agency of two flexible wires that are threaded through slots formed in oppositely issuing wings. The wings are bolted to a nonmagnetic housing which encloses the pack of permanent magnets and portions of the projecting pole pieces located at the ends of the pack. Whatever number of permanent magnet units are needed for the particular diameter of pipe can be selected and then easily held in place so that the pole faces of all of the units contact the proper segments of the pipe having the liquid flowing therethrough.

DESCRIPTION OF THE PREFERRED EMBODIMENT

Figure 1:
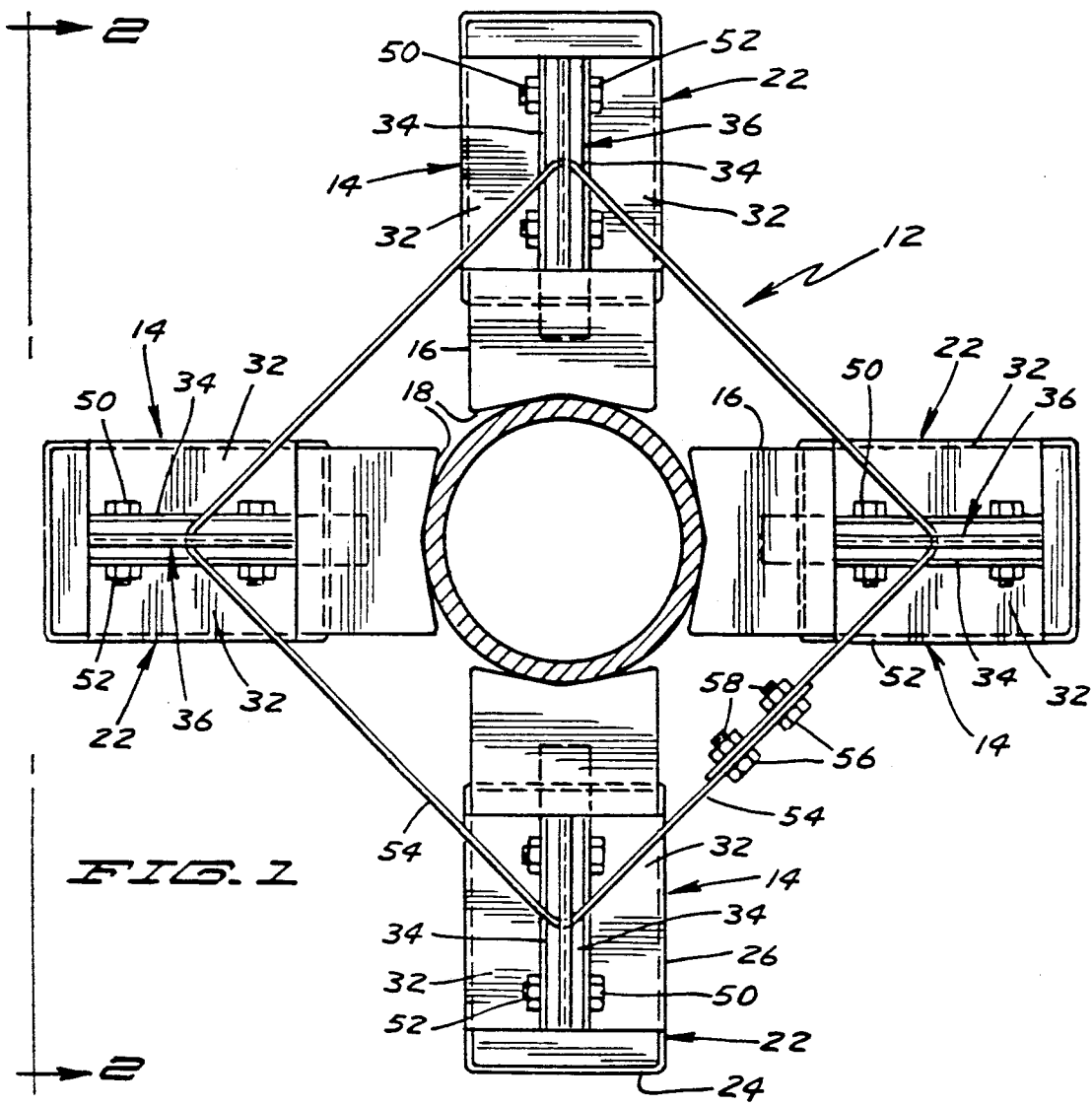
FIG. 1 is a sectional view through a pipe having my magnetic apparatus attached thereto.
Figure 2:
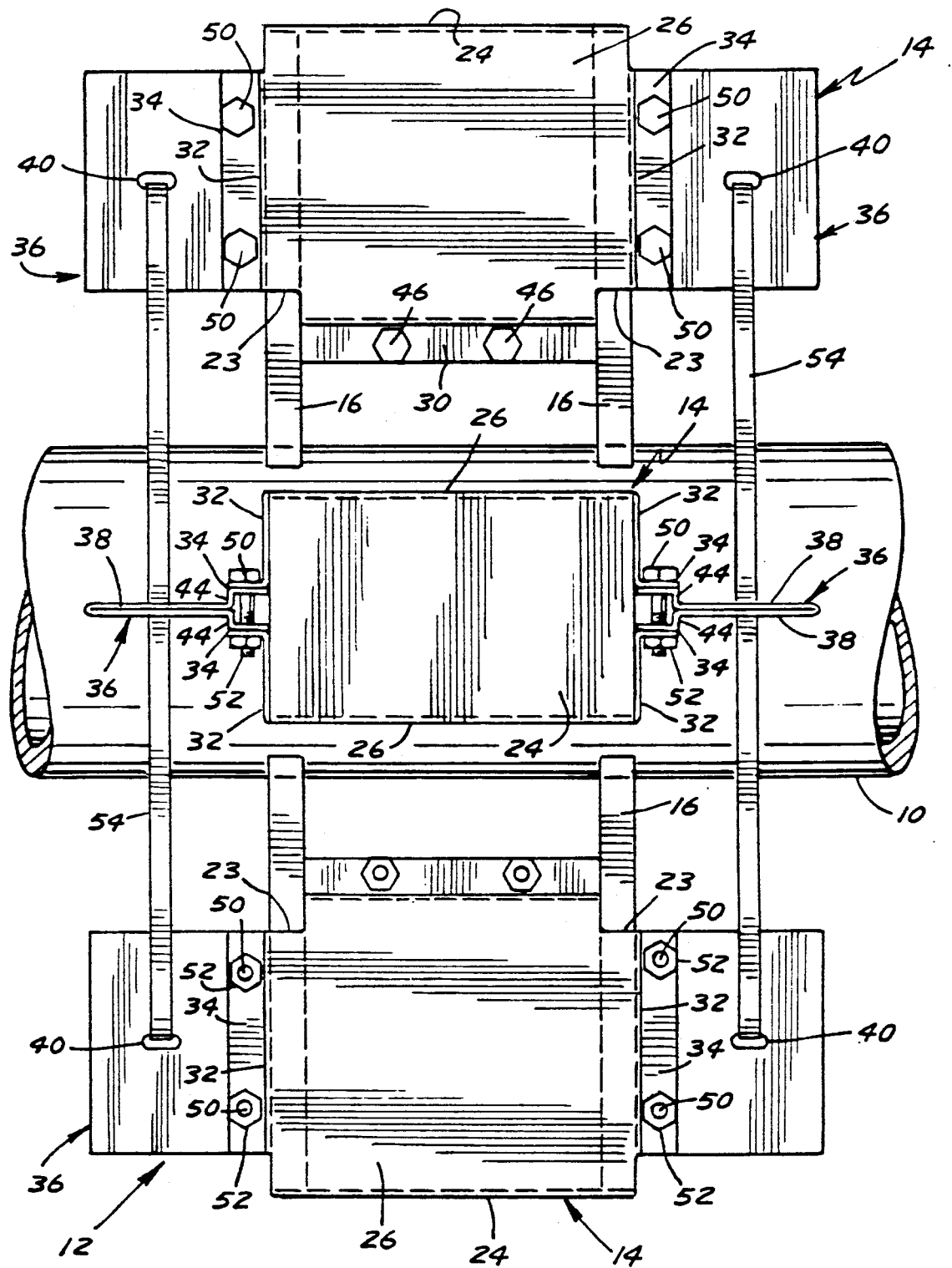
FIG. 2 is an elevational view of the apparatus, the view being taken in the direction of line 2—2 of FIG. 1.
Figure 3:
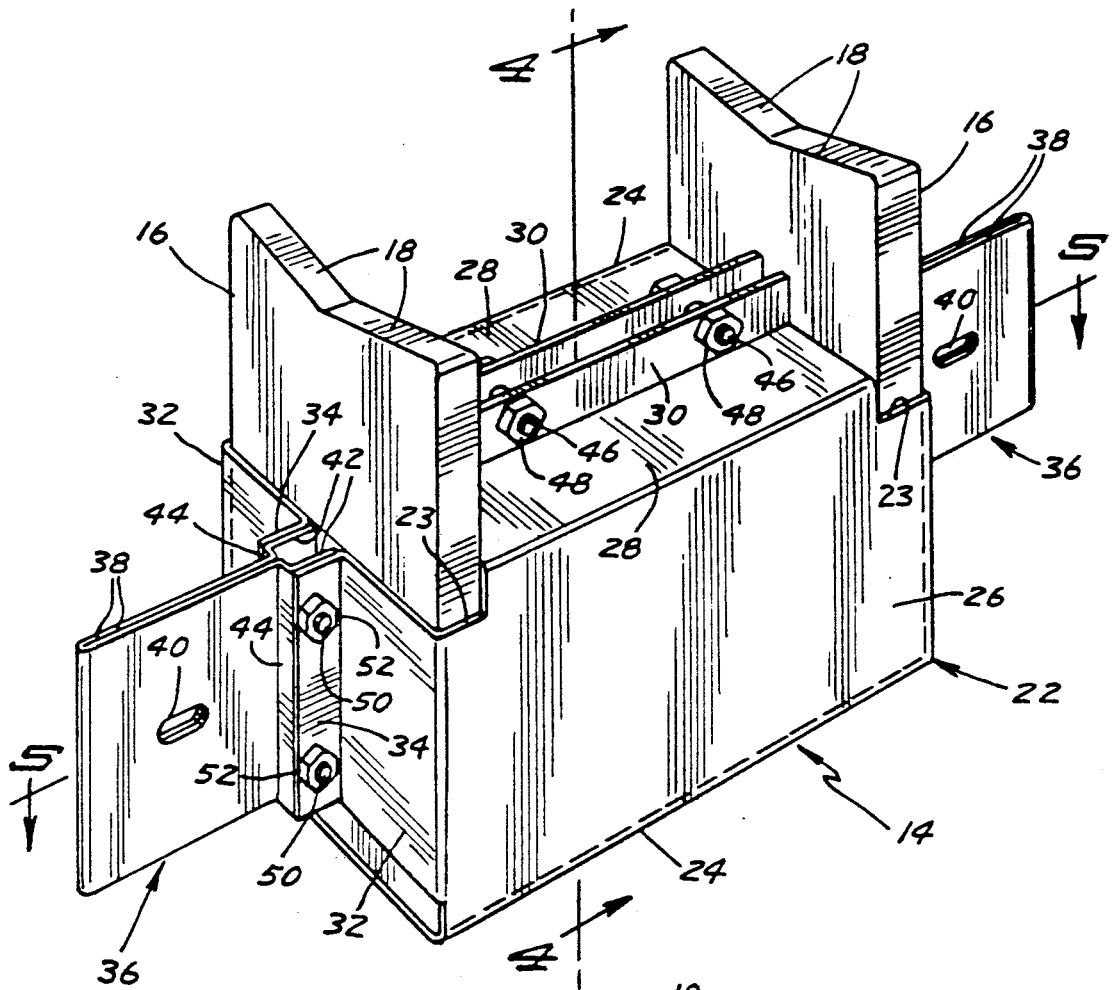

As can be seen in FIGS. 1 and 2, a pipe indicated by the reference numeral 10 has been shown. The pipe 10 may be of a non-magnetic material, such as a suitable plastic, or a carbon steel pipe, the pipe 10 in FIG. 1 having been hatched for metal. Also, the pipe 10, in practice, may vary considerably in diameter. As already pointed out, the invention is applicable for use with pipes having a four-inch diameter ranging up to those having a 60-inch diameter. The manner in which various pipe diameters are accommodated will become clear as the description progresses.

In juxtaposition with the pipe 10 is apparatus denoted generally by the reference numeral 12 which exemplifies my invention. The apparatus 12 is comprised of four units 14 in the present instance.

Figure 5:
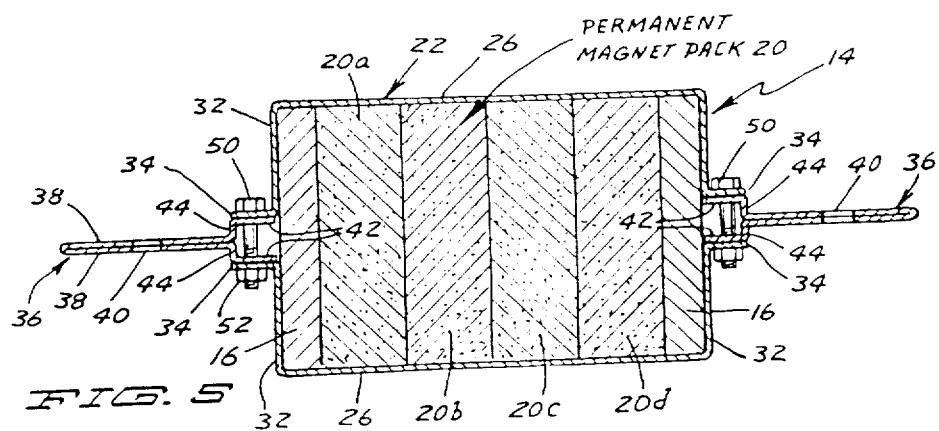
FIG. 5 is a horizontal sectional view taken in the direction of line 5—5 of FIG. 3.

Describing the units 14, which are identical to each other, it will be observed that the unit 14 in each situation includes a pair of longitudinally spaced soft iron pole pieces 16 having angled pole faces 18, the angulation enabling the pole faces 18 to better engage a segment of the outside of the pipe 10. As best understood from FIG. 5, the pole pieces 16 have a permanent magnet pack 20 therebetween composed of four individual ceramic permanent magnets 20a, 20b, 20c, and 20d.

Completely enclosing the permanent magnet pack 20 is a housing 22 of stainless steel sheet metal. As can readily be appreciated from FIG. 3, the housing 22 only partially encloses the pole pieces 16, it being necessary for these pole pieces 16 to project beyond the housing 22 so as to effectively engage the pipe 10, doing so through slots at 23.

One of the features of my invention is to obviate the need for employing a potting compound, the construction of the housing 22 that I have devised avoiding the use of any such compound. The housing 22, as oriented in FIGS. 3-5, includes a bottom panel 24, laterally spaced side panels 26 and inwardly extending top panels 28, each top panel 28 having an upstanding flange 30 integral therewith. Additionally, the housing 22 includes two panels 32 at each end, each having an outturned flange 34.

Playing an important role in the practicing of my invention are oppositely issuing wings 36, each composed of reversely folded panels 38. Particulary, wings 36 include first and second panels 38 being folded about their first edges to overlie each other and with the first edges of panels 38 being integral. Each wing 36 has an aperture in the form of a slot 40 formed therein. Also, each wing 36 is provided with a pair of parallel flanges 42, there being outturned shoulders 44 integrally connecting the flanges 42 to the second edges of the reversely folded panels 38 such that flanges 42 extend from the second edge of each panel 38.

Each permanent magnet unit 14 can be readily assembled. This is accomplished through the agency of bolts 46 and nuts 48 that extend through holes provided in the upstanding flanges 30. Tightening of the bolts 46 and nuts 48 pull the side panels 26 tightly against the permanent magnet pack 20. Additional bolts 50 and nuts 52 extend through holes provided in the flanges 34 and 42 fixedly anchor the wings 36 to the housing 22. The bolts 50 and nuts 52 also contribute to the pulling of the side panels 26 against the permanent magnet pack 20. From the foregoing description it should be understood that the resulting unit 14 is tightly held together with no loose components and without the use of a potting compound. This facilitates the mounting of the various units 14 in association with the pipe 10.

The ease with which the various units 14 can be mounted in juxtaposition with the pipe 10 is readily understood from FIGS. 1 and 2. All that the installer need do is to thread a pair of suitably dimensioned wires or straps 54 through the various slots 40. Each of the slots 40 of the wings 36 is spaced outwardly with respect to the pipe 10 and at a sufficient distance so as to space the straps 54 outwardly with respect to the pipe 10. The ends of the straps 54 when overlapped may be drilled so that bolts 56 can be inserted through the thus formed holes. Nuts 58 when tightened on the threaded ends of the bolts complete the fastening and can be twisted to hold the units 14 in place or crimped-on fasteners can be used. Inasmuch as there are a variety of ways of attaching the ends of the straps 54 together, the bolt and nut securement is only exemplary.

It is believed that a sufficient amount of information has been presented so that it is apparent that any appropriate number of permanent magnet units 14 may be employed, depending largely upon the diameter of the pipe 10. Earlier herein it has been stated that a simple formula for guiding the installer is that there should be one such unit 14 for each inch of diameter of the pipe 10. The pipe 10 can be considered to possess a diameter of four inches, and hence, four units 14 are pictured. With a 60-inch diameter pipe, one would use 60 such units 14.

Not only can my apparatus 12 be easily installed at a desired location along a pipe 10, preferably where there is a straight run devoid of turns, the apparatus 12 can be dismantled just as easily and reinstalled at any other location that may prove to be more beneficial in eliminating or minimizing deposits on the interior of the pipe 10. As well understood, the avoidance of any scale formations within a pipe through which liquid flows is most desirable. This is especially true in industrial situations because of the time required to clean out the pipes once there has been an accumulation of scale to any degree. The shutdown time can be quite costly. My invention eliminates such expense in most instances, and substantially reduces the costs in other instances by reason of the less frequent shutdowns.

Figure 3:
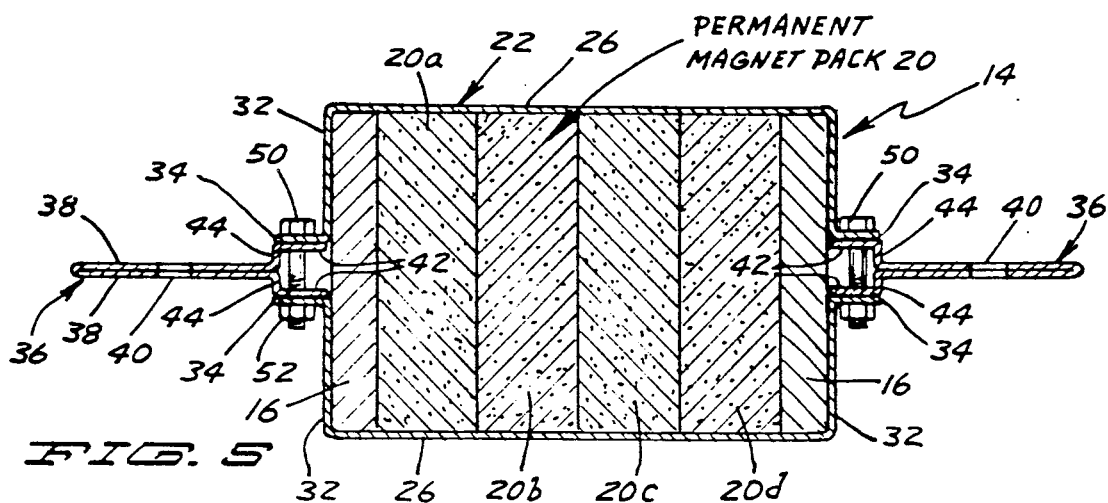
FIG. 3 is a perspective view of the lowermost unit appearing in FIGS. 1 and 2, although each unit is actually identical.
Figure 4:
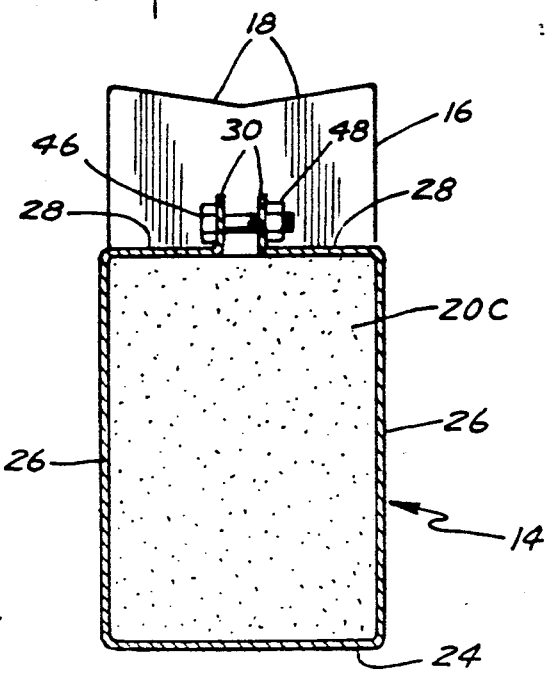
FIG. 4 is a vertical section taken in the direction of line 4—4 of FIG. 3.
Figure 1:
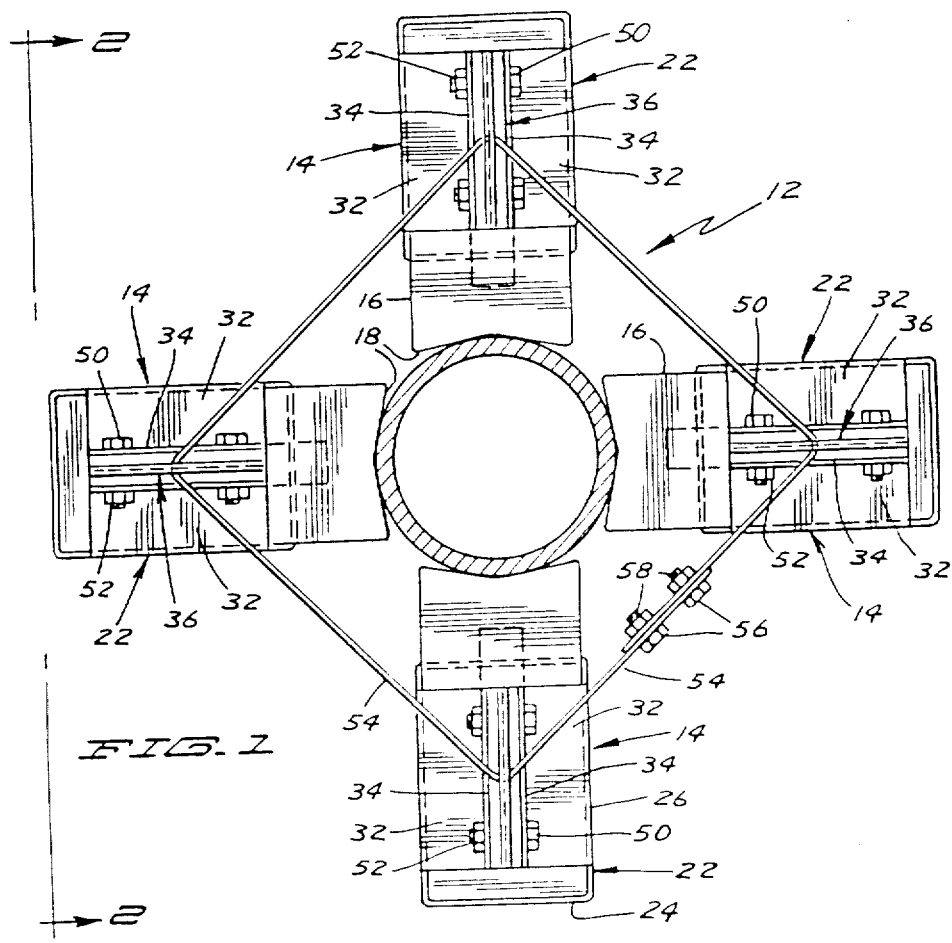

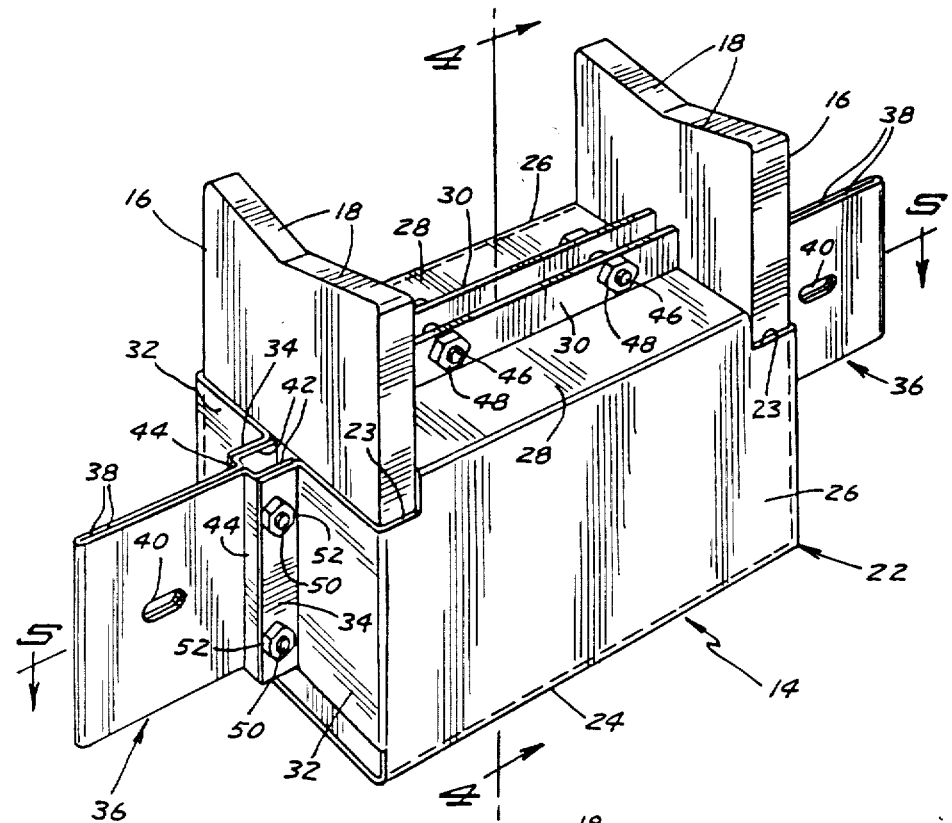
FIG. 3
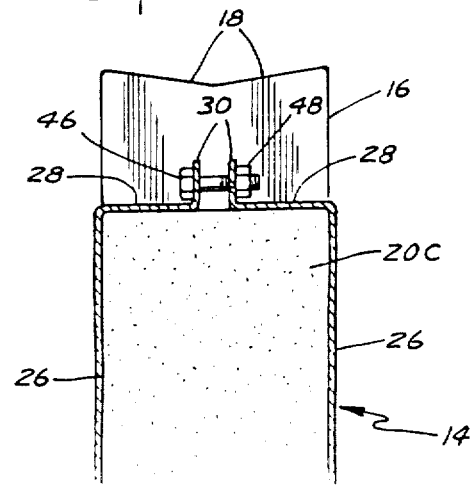

I claim:

1. In combination with a pipe having a longitudinal axis and through which fluid flows generally parallel to the longitudinal axis of the pipe, a plurality of magnetic units, each magnetic unit having first and second sides extending in a direction parallel to the longitudinal axis of the pipe and first and second ends spaced apart along the longitudinal axis of the pipe; first and second wings issuing in a direction parallel to the longitudinal axis of the pipe from the respective first and second ends of each magnetic unit, and first and second means respectively engaging the corresponding first and second wings of each unit for retaining said units in an angular relation with said pipe with the sides of the magnetic units being circumferentially spaced around the pipe and the first and second engaging means and the first and second wings being spaced apart along the longitudinal axis of the pipe.

2. The combination of claim 1 in which each of said wings has an aperture therein and said first engaging means comprises a first wire extending through the aperture in one of said wings and said second engaging means comprises a second wire extending through the aperture in the other of said wings.

3. The combination of claim 2 in which each of said apertures is spaced outwardly with respect to said pipe and at a sufficient distance so as to space said wires outwardly with respect to said pipe.

4. The combination of claim 3 wherein the magnetic units each include a pair of pole pieces and permanent magnet means therebetween, said pole pieces engaging said pipe and being spaced apart along the longitudinal axis of the pipe.

5. The combination of claim 4 wherein the magnetic units each include housing means enclosing said permanent magnet means, said pole pieces projecting from said housing means.

6. The combination of claim 5 in which each wing has a pair of parallel spaced flanges and said housing means has a pair of parallel spaced flanges adjacent said pole pieces, and bolt means extending through each pair of flanges on said wings and the pair of flanges adjacent said pole pieces of said housing means.

7. The combination of claim 6 in which each of said wings includes first and second panels including first and second edges, with the first edges of the panels of the wings being integral, with the first and second panels of the wings being folded about their first edges to overlie each other, with each flange of the wings extending from the second edge of each panel.

8. The combination of claim 1 in which each of said wings includes first and second panels having first and second edges, with the first edges of the panels of the wings being integral, with the first and second panels of the wings being folded about their first edges to overlie each other, and means for attaching said second edges to a respective said magnetic unit.

9. A magnetic unit comprising, in combination: permanent magnet means; housing means generally enclosing said magnet means, said housing means including first and second end panels and a flange on each of said end panels, with the flanges of the first and second end panels extending from the housing means outwardly from the magnet means and generally parallel to each other; a wing; and bolt means extending through said flanges on said end panels and the wing, with the wing being attached to said housing means and extending outwardly from the magnet means for use in retaining the housing means and magnet means generally enclosed therein against a pipe; wherein the housing means includes third and forth end panels and a flange on each of said third and fourth end panels, with the flanges of the third and fourth end panels extending from the housing means outwardly from the magnet means and generally parallel to each other; and wherein the magnet unit further comprises, in combination, a second wing; and second bolt means extending through the flanges on said third and fourth end panels and the second wing, with the second wing being attached to said housing means and extending outwardly from the magnet means for use in retaining the housing means and magnet means generally enclosed therein against a pipe.

10. The magnet unit of claim 9 in which each said wing includes first and second panels including first and second edges, with the first edges of the panels of the wing being integral, with the first and second panels of the wing being folded about their first edges to overlie each other with the additional bolt means extending through the first and second panels adjacent their second edges.

11. The magnet unit of claim 10 in which said wing includes spaced, parallel flanges with the bolt means extending through the flanges of the wing.

12. The magnet unit of claim 9 in which said wing includes parallel spaced flanges with the bolt means extending through the parallel spaced flanges of the wing.

13. The magnet unit of claim 12 wherein the flanges on said end panels of the housing means are spaced apart from one another.

14. A magnet unit comprising, in combination: a pair of spaced pole pieces and permanent magnet means therebetween; housing means generally enclosing said magnet means and having slots via which said pole pieces project; and means for attaching said housing means to a pipe for use in retaining the projecting ends of said pole pieces against the pipe, in which said housing means includes a base panel, first and second side panels extending from the base panel and including first and second ends, first and second top panels extending from the first and second side panels, with each of said top panels including a flange extending outwardly from the magnet means, with the flanges of the top panels being generally parallel to each other, first and second end panels extending from the first and second ends of the first side panel, respectively, and third and fourth end panels extending from the first and second ends of the second side panel, respectively, with each of said end panels including a flange extending outwardly from the magnet means, with the flanges of the first and third end panels and of the second and fourth end panels being generally parallel to each other, bolt means extending through the flanges on said top panels, and first and second additional bolt means extending through the flanges of the first and third end panels and extending through the flanges of the second and fourth end panels, respectively.

15. The magnet unit of claim 14 wherein the slots are located in the top panels and the flanges on said top panels.

16. The magnet unit of claim 14 wherein the attaching means comprises a pair of wings extending outwardly from the magnet means, with the additional bolt means extending through the wings and the flanges on said end panels.

17. The magnet unit of claim 16 wherein the wings include spaced, parallel flanges and the flanges on said end panels are spaced, with the additional bolt means extending through the flanges of the wings.

18. The magnet unit of claim 17 in which each of said wings include first and second panels including first and second edges, with the first edges of the panels of the wings being integral, with the first and second panels of the wings being folded about their first edges to overlie each other, with the flanges of the wings extending from the second edge of each panel.

19. The magnet unit of claim 16 in which each of said wings include first and second panels including first and second edges, with the first edges of the panels of the wings being integral, with the first and second panels of the wings being folded about their first edges to overlie each other with the additional bolt means extending through the first and second panels adjacent their second edges.

20. In combination with a pipe through which fluid flows, a plurality of angularly spaced magnetic units, each magnetic unit having a pair of oppositely issuing wings, each of said wings including first and second panels having first and second edges, with the first edges of the panels of the wings being integral, with the first and second panels of the wings being folded about their first edges to overlie each other, means for attaching said second edges to a respective said magnetic unit, and respective means engaging the correspondingly positioned wings of each unit to retain said units in an angular relation with said pipe.

21. The combination of claim 20 wherein the pipe has a longitudinal axis, with the fluid flowing generally parallel to the longitudinal axis of the pipe, wherein the pair of wings are spaced apart along the longitudinal axis of the pipe, with the respective means including first means for attaching one of the pair of the wings together in an angularly spaced relation and a second means for attaching the other of the pair of the wings together in an angularly spaced relation.

22. The combination of claim 21 wherein said first and second attaching means are spaced apart along the longitudinal axis of the pipe.

23. The combination of claim 22 in which each of said wings has an aperture therein and said first attaching means comprises a first wire extending through said aperture in one of said pair of wings and said second attaching means comprises a second wire extending through said aperture in the other of said pair of wings.

24. The combination of claim 23 in which each of said apertures is spaced radially outwardly with respect to said pipe and at a sufficient distance so as to space said wires outwardly with respect to said pipe.

25. The combination of claim 20 in which each wing has a pair of parallel spaced flanges and in which each magnetic unit includes a housing having a pair of parallel spaced flanges, and bolt means extending through each pair of flanges on said wings and the pair of flanges of the housing.

* * * * *

UNITED STATES PATENT AND TRADEMARK OFFICE
CERTIFICATE OF CORRECTION

PATENT NO. : 5,078,870

DATED : January 7, 1992

INVENTOR(S) : Roland K. Carpenter

It is certified that error appears in the above-identified patent and that said Letters Patent is hereby corrected as shown below:

Sheets 1 and 3 of the drawings should be deleted to be replaced with the sheets of drawings as shown on the attached sheets.

Column 3, line 65, cancel "myin-" and substitute therefor --my in- --.

Column 6, line 18, after "other" insert --,--.

Column 7, line 15, after "other" insert --,--.

Signed and Sealed this

Twenty-eighth Day of September, 1993

Attest:

BRUCE LEHMAN

*Attesting Officer*     *Commissioner of Patents and Trademarks*